(12) United States Patent
Takasu

(10) Patent No.: US 10,214,025 B2
(45) Date of Patent: Feb. 26, 2019

(54) IMAGE PROCESSING APPARATUS AND NON-TRANSITORY COMPUTER-READABLE MEDIUM STORING IMAGE PROCESSING PROGRAM

(71) Applicant: BROTHER KOGYO KABUSHIKI KAISHA, Nagoya-shi, Aichi-ken (JP)

(72) Inventor: Masaya Takasu, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/908,961

(22) Filed: Mar. 1, 2018

(65) Prior Publication Data
US 2018/0250949 A1 Sep. 6, 2018

(30) Foreign Application Priority Data
Mar. 3, 2017 (JP) .................................. 2017-040888

(51) Int. Cl.
*B41J 2/21* (2006.01)
*B41J 2/045* (2006.01)
*B41J 29/393* (2006.01)
*H04N 1/00* (2006.01)

(52) U.S. Cl.
CPC ......... *B41J 2/2142* (2013.01); *B41J 2/04558* (2013.01); *B41J 2/2146* (2013.01); *B41J 29/393* (2013.01); *H04N 1/00031* (2013.01)

(58) Field of Classification Search
CPC ........ B41J 2/04505; B41J 3/54; B41J 2/2132; B41J 3/36; B41J 2/04586; B41J 2/51
See application file for complete search history.

(56) References Cited

U.S. PATENT DOCUMENTS

| | | | |
|---|---|---|---|
| 2009/0244153 A1 | 10/2009 | Miyamoto | |
| 2013/0321513 A1* | 12/2013 | Chen | B41J 29/393 347/19 |
| 2016/0318323 A1* | 11/2016 | Imanishi | B41J 11/008 |
| 2017/0021612 A1* | 1/2017 | Yamanobe | B41J 2/01 |
| 2017/0066268 A1* | 3/2017 | Kyoso | B41J 2/155 |

FOREIGN PATENT DOCUMENTS

| | | |
|---|---|---|
| JP | 2006-305958 A | 11/2006 |
| JP | 2009-234116 A | 10/2009 |

* cited by examiner

*Primary Examiner* — Julian D Huffman
(74) *Attorney, Agent, or Firm* — Scully, Scott, Murphy & Presser, PC

(57) ABSTRACT

There is provided an image processing apparatus including a controller configured to execute: causing a printing execution unit to execute printing of a first test image and a second test image; acquiring first scan image data; acquiring second scan image data; identifying a first boundary; identifying a first number of pixels and a second number of pixels; calculating a first number of unit pixels and a second number of unit pixels; calculating a relevant value related to density of a dot formed by each nozzle; and generating characteristics data which indicates ink jetting characteristics of N pieces of nozzle.

8 Claims, 8 Drawing Sheets

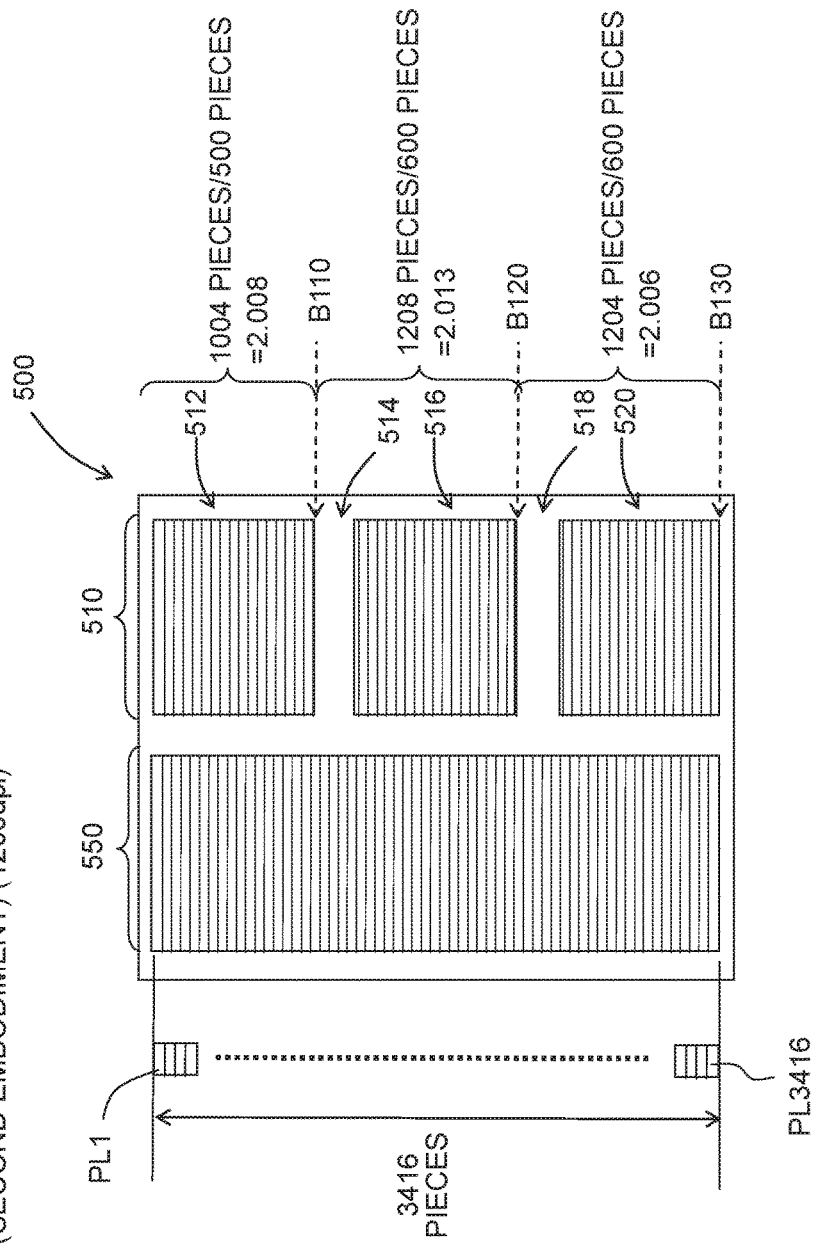

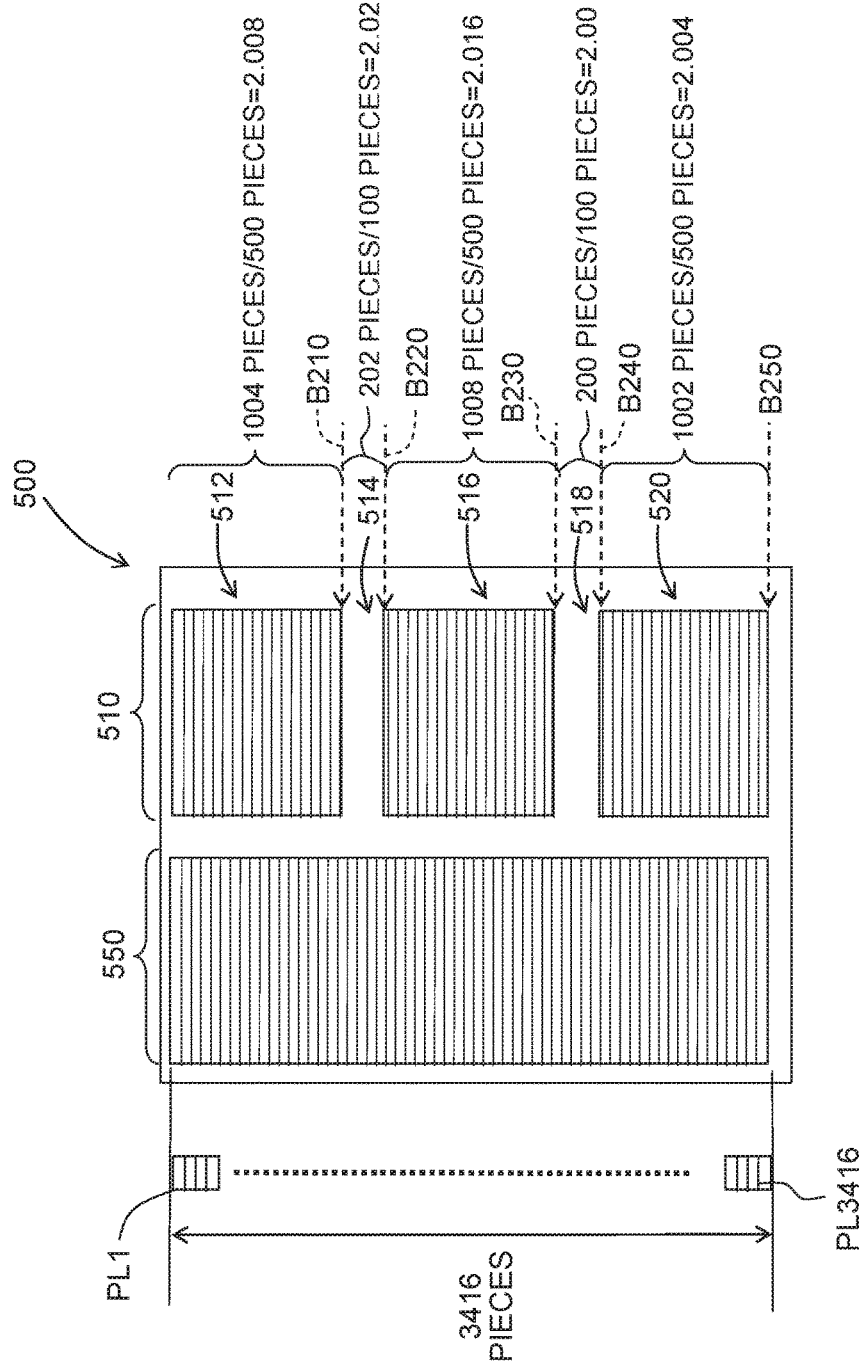

IMAGE PROCESSING APPARATUS AND NON-TRANSITORY COMPUTER-READABLE MEDIUM STORING IMAGE PROCESSING PROGRAM

CROSS REFERENCE TO RELATED APPLICATION

The present application claims priority from Japanese Patent Application No. 2017-040888 filed on Mar. 3, 2017, the disclosure of which is incorporated herein by reference in its entirety.

BACKGROUND

Field of the Invention

The present disclosure relates to an image processing apparatus for an ink-jet printer.

Description of the Related Art

There is known a method for calculating a correction value for an ink-jet printer having a long head. First, the printer prints a test pattern on a medium by jetting ink from all nozzles provided in the long head. Then, a scanner generates a scan image by scanning the test pattern printed on the medium. Next, a computer calculates a correction value for correcting ink jetting characteristics of each nozzle based on the scan image.

SUMMARY

When the scanner scans the test pattern, movement speed of a scan execution part, such as a CCD or CIS of the scanner, may not be constant. This may cause a phenomenon, called image elongation, in which a length of the scan image in a movement direction of the scan execution part is longer than a length of the test pattern in the movement direction. The image elongation makes it hard to appropriately map each pixel included in the scan image to each nozzle of a printer. This may make it hard to appropriately correct ink jetting characteristics of each nozzle.

An object of the present teaching is to provide technology which may appropriately correct ink jetting characteristics of each nozzle while reflecting an influence of image elongation.

According to an aspect of the present teaching, there is provided an image processing apparatus, including: a controller configured to control a printing execution unit including N pieces of nozzle arranged in a first direction, the N being an integer equal to or more than three. The N pieces of nozzle includes: N1 pieces of nozzle continuously arranged; N2 pieces of nozzle arranged continuously and adjacent to the N1 pieces of nozzle; and N3 pieces of nozzle arranged continuously and adjacent to the N2 pieces of nozzle, the N1, N2, N3 being integers equal to or more than one. The controller is configured to perform: causing the printing execution unit to execute printing of a first test image by jetting ink droplets from all the N pieces of nozzle to a first recording medium, the first test image including N pieces of dot arranged in the first direction on the first recording medium, causing the printing execution unit to execute printing of a second test image by jetting ink droplets from the N1 pieces of nozzle and the N3 pieces of nozzle to a second recording medium without jetting ink droplets from the N2 pieces of nozzle. The second test image is different from the first test image. The second test image includes: N1 pieces of dot arranged in the first direction on the second recording medium; N3 pieces of dot arranged in the first direction on the second recording medium; and a first blank area between the N1 pieces of dot and the N3 pieces of dot. The controller is configured to perform: acquiring first scan image data generated by causing the scan execution unit to scan the first recording medium by moving in the first direction after the first test image is printed on the first recording medium, the first scan image data including M pieces of dot pixel indicating the N pieces of dot included in the first test image, the M being an integer equal to or more than the N; acquiring second scan image data generated by causing the scan execution unit to scan the second recording medium by moving in the first direction after the second test image is printed on the second recording medium. The second scan image data includes: M1 pieces of dot pixel indicating the N1 pieces of dot included in the second test image; M2 pieces of blank pixel indicating the first blank area included in the second test image; and M3 pieces of dot pixel indicating the N3 pieces of dot included in the second test image, the M1 being an integer equal to or more than the N1, the M2 being an integer equal to or more than the N2, and the M3 being an integer equal to or more than the N3. The controller is configured to perform: identifying a first boundary which is at least one of (1) a boundary between the M1 pieces of dot pixel and the M2 pieces of blank pixel and (2) a boundary between the M2 pieces of blank pixel and the M3 pieces of dot pixel, by using the M2 pieces of blank pixel included in the second scan image data; identifying a first number of pixels including the number of pixels of the M1 pieces of dot pixel present at a first side of the first boundary and a second number of pixels including the number of pixels of the M3 pieces of dot pixel present at a second side of the first boundary, by using the second scan image data; calculating a first number of unit pixels which is the number of pixels per one nozzle for the N1 pieces of nozzle by using the N1 and the first number of pixels; calculating a second number of unit pixels which is the number of pixels per one nozzle for the N3 pieces of nozzle by using the N3 and the second number of pixels; calculating a relevant value related to density of a dot formed by each of the N pieces of nozzle by using the first number of unit pixels, the second number of unit pixels, and a pixel value of each of the M pieces of dot pixel included in the first scan image data; and generating characteristics data indicating ink jetting characteristics of the N pieces of nozzle by using N pieces of the relevant value calculated for the N pieces of nozzle.

In the above configuration, the second test image includes the first blank area between the N1 pieces of dot and the N3 pieces of dot. This allows the image processing apparatus to identify the first boundary and to identify the first number of pixels and the second number of pixels based on the first boundary. Then, the image processing apparatus calculates the first number of unit pixels that is the number of pixels per one nozzle for the N1 pieces of nozzle by use of the first number of pixels, and calculates the second number of unit pixels that is the number of pixels per one nozzle for the N3 pieces of nozzle by use of the second number of pixels. Namely, the image processing apparatus calculates the first number of unit pixels and the second number of unit pixels that reflect the influence of image elongation for at least the N1 piece of nozzle and the N3 pieces of nozzle of the N pieces of nozzle. Then, the image processing apparatus calculates the relevant value of each nozzle by using the first number of unit pixels and the second number of unit pixels, and generates the characteristics data by using the relevant value of each nozzle. In that case, for example, the image processing apparatus may use the characteristics data generated to correct ink jetting characteristics of each nozzle. Thus, the image processing apparatus may appropriately correct the ink jetting characteristics of each nozzle while reflecting the influence of image elongation.

A control method for achieving the above image processing apparatus, a computer program, and a computer-readable recording medium storing the computer program are new and useful. A printing system including the above image processing apparatus, the above printing execution unit, and the above scan execution unit are newly useful.

BRIEF DESCRIPTION OF THE DRAWINGS

FIG. 7 is an illustrative view of characteristics data generation processing according to a second embodiment.

FIG. 8 is an illustrative view of characteristics data generation processing according to a third embodiment.

DESCRIPTION OF THE EMBODIMENTS

First Embodiment

Figure 1:
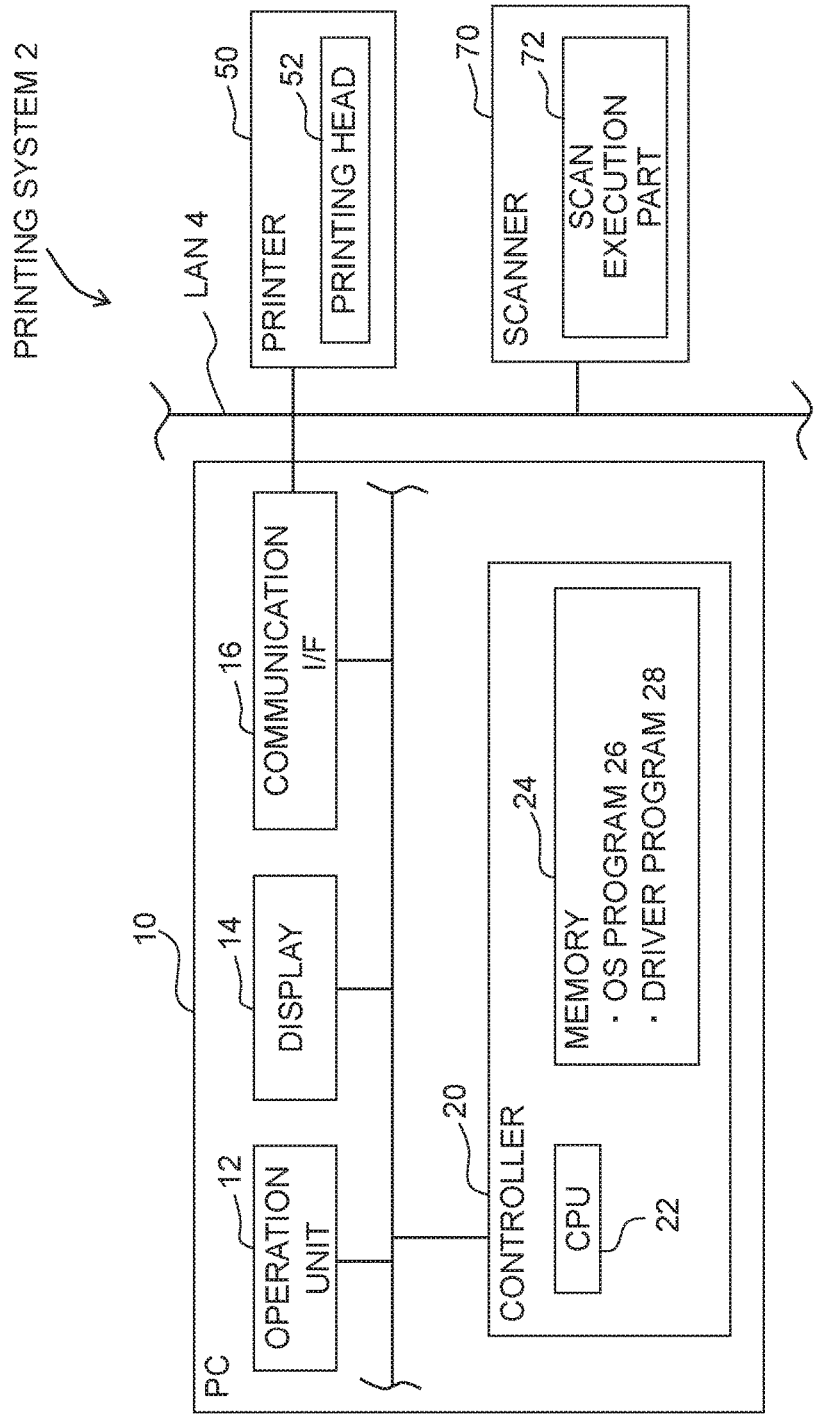
FIG. 1 is a block diagram of a printing system.

Configuration of Printing System 2; FIG. 1

As depicted in FIG. 1, a printing system 2 includes a PC 10 (an abbreviation for a personal computer), a printer 50, and a scanner 70. The PC 10 communicates with the printer 50 and the scanner 70 via a LAN 4. The printer 50 and the scanner 70 are peripherals of the PC 10.

Configuration of PC 10

The PC 10 includes an operation unit 12, a display 14, a communication interface 16, and a controller 20. In the following, the interface is described as "I/F". The operation unit 12 includes a keyboard and a mouse. A user operates the operation unit 12 to input a variety of instructions to the PC 10. The display 14 is a display on which a variety of information is displayed. The communication 16 is connected to the LAN 4.

The controller 20 includes a CPU 22 and a memory 24. The memory 24 includes a Read Only Memory (ROM), a Random Access Memory (RAM), and the like. The CPU 22 executes a variety of processing in accordance with, for example, an OS program 26 and a driver program 28 stored in the memory 24. The OS program 26 allows the CPU 22 to execute basic operations of the PC 10. The driver program 28 is provided by a manufacturer of the printer 50 to allow the CPU 22 to execute processing related to the printer 50. The driver program 28 may be installed, for example, from a media that is shipped with the printer 50 to the PC 10 or from a server on the Internet provided by the manufacturer of the printer 50 to the PC 10.

Configuration of Printer 50

Figure 2:
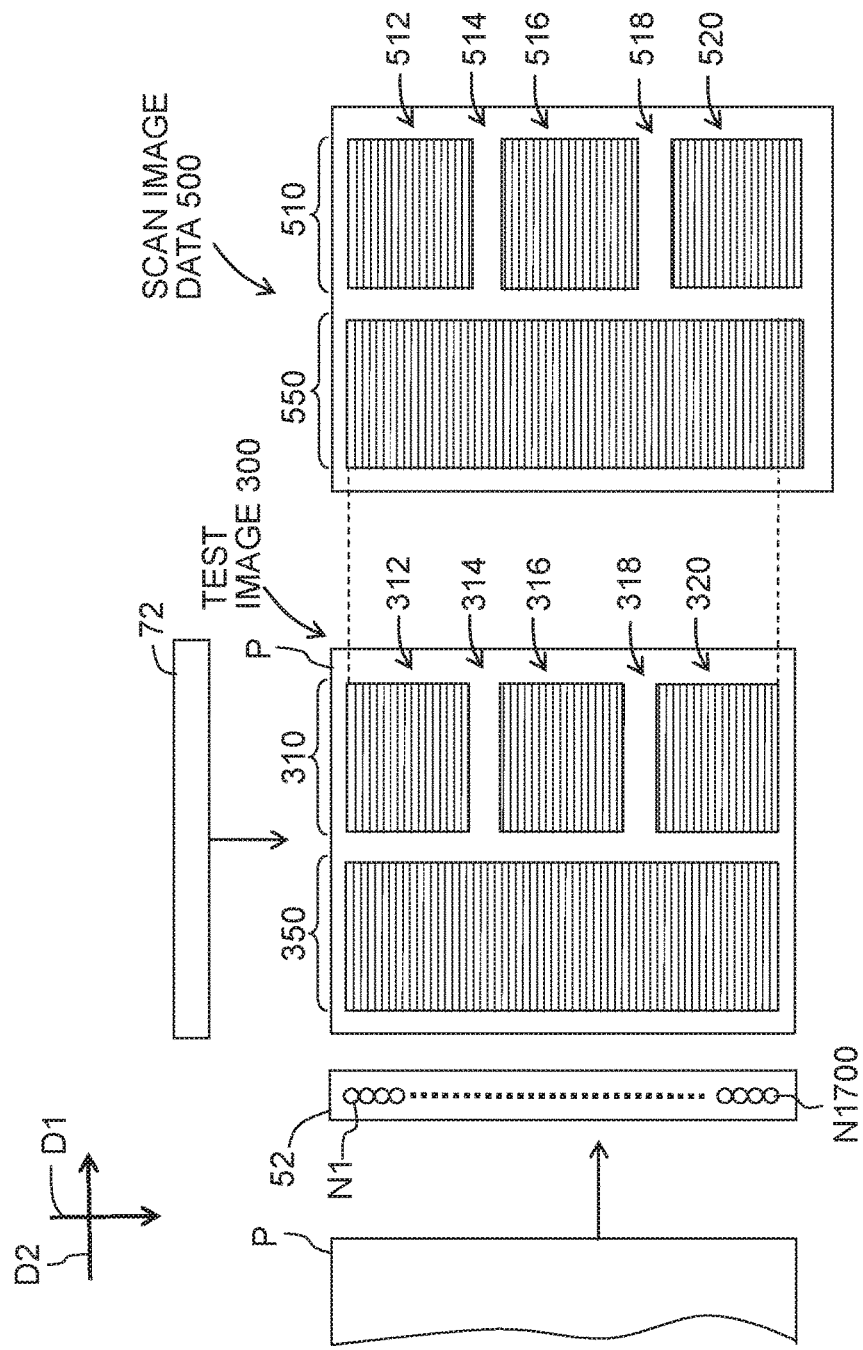
FIG. 2 depicts an arrangement direction of nozzles of a printing head relative to a recording medium and a scan direction of a scan execution part.

The printer 50 is an ink-jet printer of a line-head type. In the first embodiment, the printer 50 executes monochrome printing. The printer 50 includes a printing head 52, a head driving unit, a conveyance unit, and a controller (those of which are not depicted in the drawings except for the printing head 52). FIG. 2 is a schematic plan view of the printing head 52. The printing head 52 is a line head (also referred to as a long head) configured not to move in directions D1 and D2 (i.e., configured not to perform main scanning). The direction D1 is a direction orthogonal to the direction D2. that is a conveyance direction of the sheet P. The length of the printing head 52 in the direction D1 is longer than the length of the sheet P in the direction D1. The printing head 52 includes 1700 nozzles including a nozzle N1 to a nozzle N1700. Each nozzle is a nozzle from which black ink (K) is jetted, The nozzles N1 to N1700 are arranged in the direction D1, Although only N1 and N1700 are indicated as reference numerals of nozzles in FIG. 2, in the following, X-th piece of nozzle (X is an integer not less than 1 and not more than 1700) from a side of the nozzle N1 may be referred to as a "nozzle NX" (e.g., the 500th nozzle may be referred to as a "nozzle N500").

Figure 4:
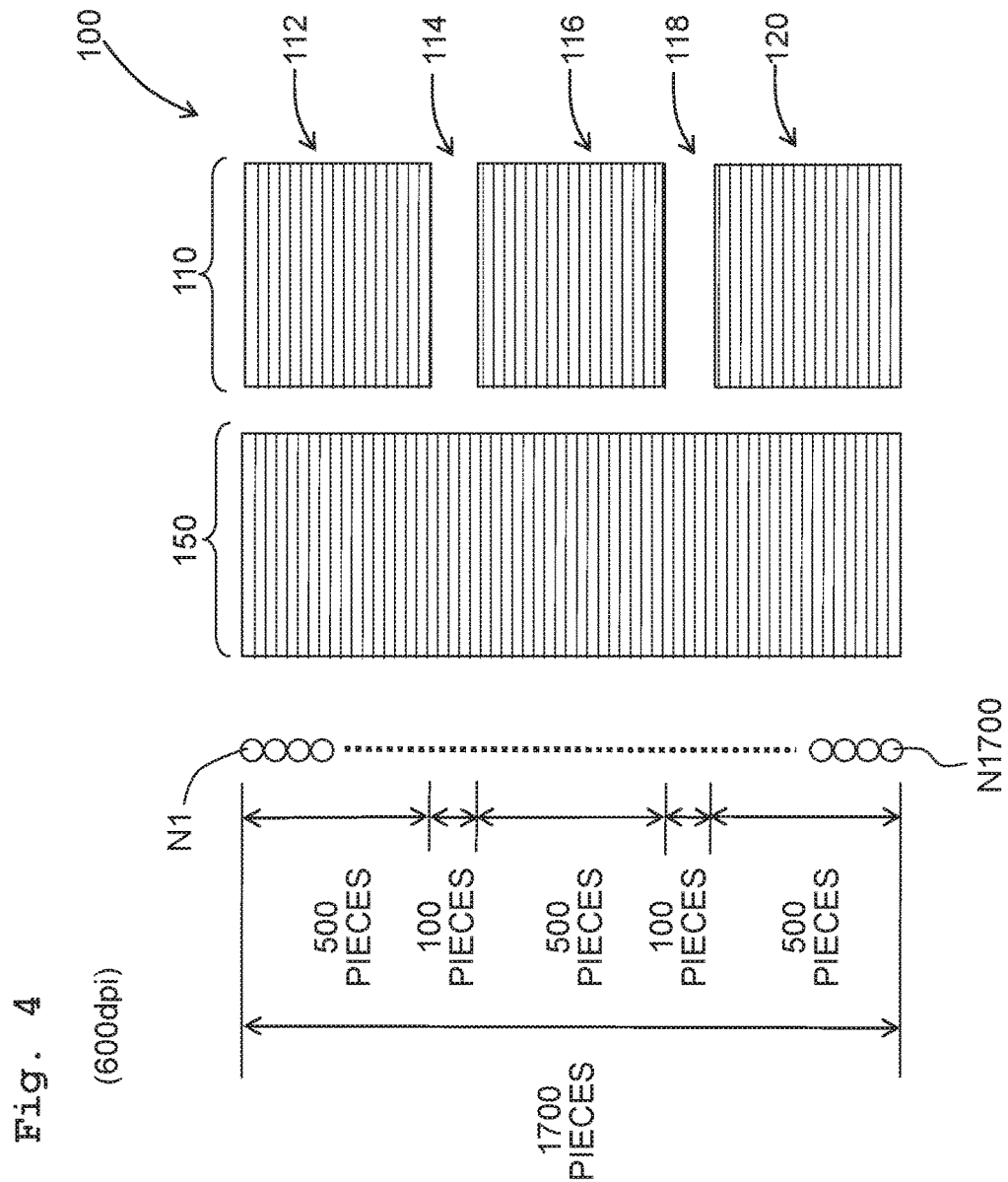
FIG. 4 depicts exemplary test pattern data.

The head driving unit causes the printing head 52 to jet ink droplets in accordance with an instruction from the controller. The conveyance unit takes each sheet P loaded in a feed tray out of the feed tray and conveys the sheet P in the direction D2 in accordance with an instruction from the controller. The controller controls the operations of the head driving unit and the conveyance unit in accordance with printing data. (e.g., test pattern data 100 depicted in FIG. 4) supplied from the PC 10. The printer 50 having the above configuration achieves printing on the sheet P by causing the printing head 52 to jet ink onto the sheet P while causing the conveyance unit to convey the sheet P in the direction D2. FIG. 2 depicts a case in which the printer 50 prints a test image 300 on the sheet P based on the test pattern data 100 (see FIG. 4) from the PC 10.

Configuration of Scanner 70

The scanner 70 is an image scanner that scans a sheet to generate scan image data indicating an image recorded on the sheet. In the first embodiment, the scanner 70 is a flatbed scanner. The scanner 70 includes a platen, a scan execution part 72, and a controller (those of which are not depicted in the drawings except for the scan execution part 72). The platen is a base or mount on which the sheet P to be scanned (see FIG. 2) is placed. The scan execution part 72 is a scan mechanism, such as a Charge Coupled Device (CCD) or Contact Image Sensor (CIS). The scan execution part 72 scans the sheet P placed on the platen based on an instruction from the controller. The scan execution part 72 scans the sheet P at a position above the sheet P placed on the platen (at a near side in a direction perpendicular to the sheet surface of FIG. 2) while moving in the direction D1. Namely, the scan execution part 72 scans the sheet P in the direction D1 that is the same as the arrangement direction of the nozzles of the printing head 52 of the printer 50. The controller generates the scan image data using a scan result of the scan execution part 72. In FIG. 2, the scan image data 500 is generated by causing the scanner 70 to scan the sheet P on which the test image 300 is printed.

When the scanner 70 scans the test image 300 of the sheet P, movement speed of the scan execution part 72 may not be constant. In that case, a phenomenon, so-called image elongation in which the length of the scan image is longer than the length of the test image 300, may occur. FIG. 2 depicts a case in which the image elongation has occurred during the scanning, wherein the length, in the direction D1, of the scan image indicated by the scan image data 500 is longer than the length of the test image 300 of the sheet P in the direction D1.

Figure 3:
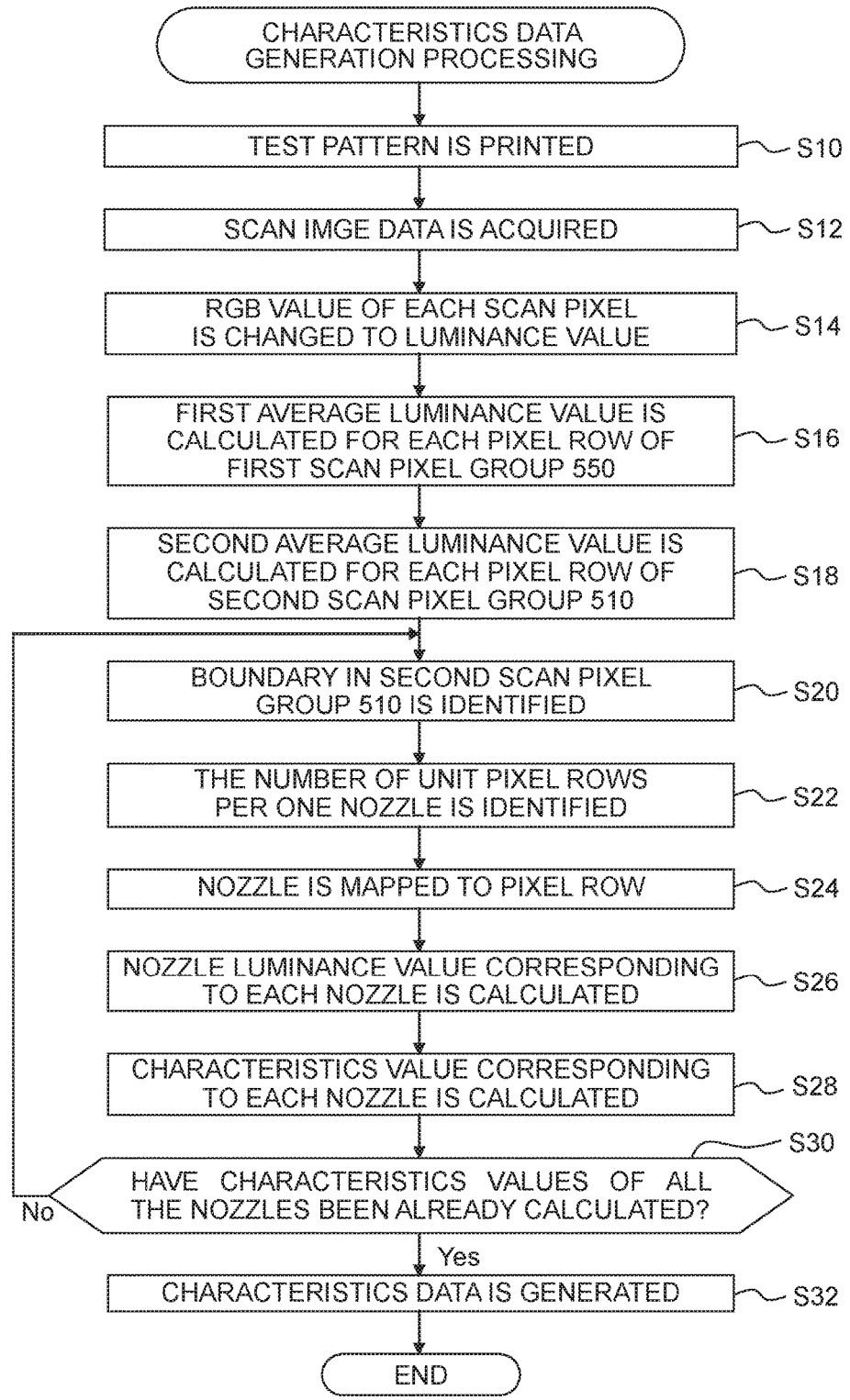
FIG. 3 is a flowchart of characteristics data generation processing executed by a CPU of a PC.

Characteristics Data Generation Processing: FIG. 3

Subsequently, the characteristics data generation processing executed by the CPU 22 of the PC 10 is explained. The characteristics data generation processing is processing of generating characteristics data that indicates ink jetting characteristics of the 1700 nozzles including the nozzles N1 to N1700 of the printing head 52 of the printer 50. When the user inputs a start instruction of the characteristics data generation processing to the operation unit 12 of the PC 10, the CPU 22 executes the characteristics data generation processing indicated in FIG. 3 in accordance with the driver program 28.

In a step S10, the CPU 22 causes the printer 50 to print a test pattern. The test pattern is an image indicated by the test pattern data 100 depicted in FIG. 4. The driver program 28 includes a program for generating the predetermined test pattern data 100. In the test pattern data 100, each printing pixel including a pixel value to jet ink droplets is hatched, and each printing pixel including a pixel value to jet no ink droplets is depicted as a blank. The test pattern data 100 includes a first printing-pixel group 150 formed from printing pixels and a second printing-pixel group 110 formed from printing pixels. The first printing-pixel group 150 is a pixel group for jetting ink droplets from all the 1700 nozzles including the nozzles N1 to N1700 of the printing head 52.

The second printing-pixel group 110 includes five subgroups 112, 114, 116, 118, and 120. The subgroup 112 is a group in which ink droplets are jetted from all 500 nozzles (the nozzles N1 to N500), of the 1700 nozzles of the printing head 52, positioned at a first end side in the direction D1. The subgroup 114 is a subgroup in which no ink droplets are jetted from 100 nozzles (the nozzles N501 to N600) adjacent to the nozzle N500. Similarly, the subgroup 116 is a group in which ink droplets are jetted from all 500 nozzles (the nozzles N601 to N1100) adjacent to the nozzle N600. The subgroup 118 is a group in which no ink droplets are jetted from 100 nozzles (the nozzles N1101 to N1200) adjacent to the nozzle N1100. The subgroup 120 is a group in which ink droplets are jetted from all 500 nozzles (the nozzles N1201 to N1700) adjacent to the nozzle N1200.

The processing executed by the CPU 22 in the step S10 is specifically explained. The CPU 22 generates one test pattern file including the predetermined test pattern data 100, and supplies the test pattern file to the printer 50. The test pattern file includes, in addition to the test pattern data 100, print setting information that indicates print setting. The print setting includes, for example, print resolution and a sheet size. In the first embodiment, the print resolution is 600 dpi.

When acquiring the test pattern file from the PC 10, the printer 50 jets ink from the printing head 52 to the sheet P based on the test pattern data while conveying the sheet P in the direction D2. In this way, the printer 50 executes the printing on the sheet P. The printer 50 executes the printing by using the print setting indicated by the print setting information. As a result, the test image 300 is printed on the sheet P, as depicted in FIG. 2.

The test image 300 depicted in FIG. 2 includes a first test image 350 and a second test image 310. The first test image 350 and the second test image 310 respectively correspond to the first printing-pixel group 150 and the second printing-pixel group 110 of the test pattern data 100 in FIG. 4. The first test image 350 is an image on the sheet P formed from dots of ink droplets that are jetted, multiple times, from all the 1700 nozzles (the nozzles N1 to N1700) of the printing head 52. Namely, the first test image 350 includes 1700 dot rows aligned in the direction D1. Each dot row is formed from dots aligned in the direction D2.

The second test image 310 includes areas 312, 314, 316, 318, and 320. The areas 312, 314, 316, 318, and 320 respectively correspond to the five subgroups 112, 114, 116, 118, and 120 of the test pattern data 100 in FIG. 4. The area 312 is a dot area on the sheet P formed from dots of ink droplets that are jetted, multiple times, from all the 500 nozzles including the nozzles N1 to N500. Namely, the area 312 includes 500 dot rows aligned in the direction D1. The area 314 is a blank area where no ink droplets are jetted from the 100 nozzles including the nozzles N501 to N600. The area 316 is a dot area on the sheet P formed from dots of ink droplets that are jetted, multiple times, from all the 500 nozzles including the nozzles N601 to N1100. The area 318 is a blank area where no ink droplets are jetted from the 100 nozzles including the nozzles N1101 to N1200. The area 320 is a dot area on the sheet P formed from dots of ink droplets that are jetted, multiple times, from all the 500 nozzles including the nozzles N1201 to N1700.

In a step S12, the CPU 22 acquires scan image data 500 (see FIGS. 2 and 5) from the scanner 70. The user puts the sheet P having the test image 300 printed thereon on the platen of the scanner 70, and inputs a scan start instruction to the operation unit 12 of the PC 10. When the scan start instruction is input, the CPU 22 supplies a scan instruction to the scanner 70. The scan instruction includes scan setting information indicating scan setting. The scan setting includes, for example, scan resolution and a sheet size. In the first embodiment, the scan resolution is 1200 dpi that is twice as much as the print resolution.

When acquiring the scan instruction from the PC 10, the scanner 70 executes scanning by using the scan setting indicated by the scan setting information. The scanner 70 executes the scanning while moving the scan execution part 72 in the direction D1, thus generating the scan image data 500 (see FIGS. 2 and 5). Then, the scanner 70 generates one scan image file including the scan image data 500 and supplies the scan image file to the PC 10. This allows the CPU 22 to acquire the scan image data 500 in the step S12.

Figure 5:
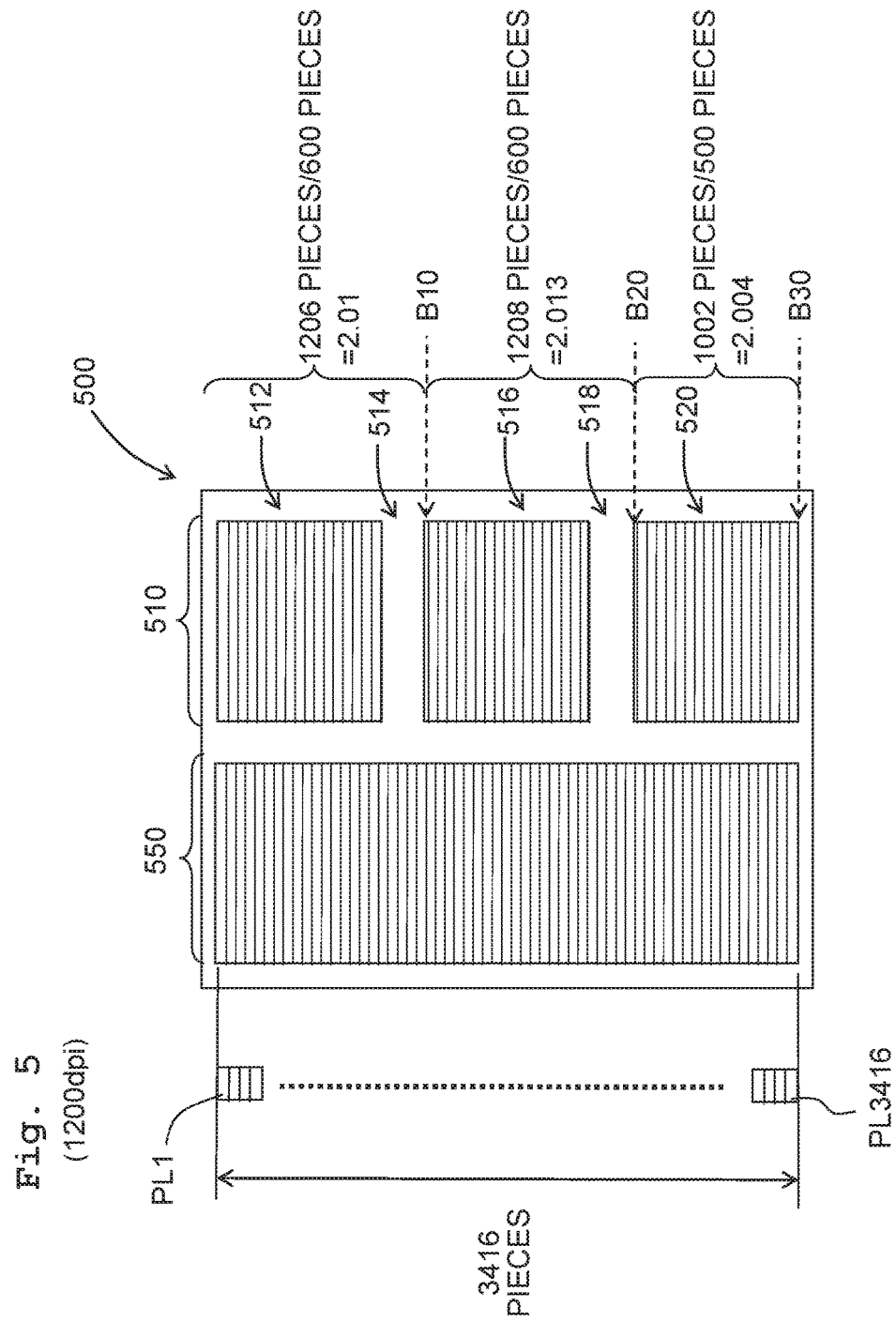
FIG. 5 depicts exemplary scan image data.

In the scan image data 500 depicted in FIG. 5, each scan pixel indicating each dot in the test image 300 is hatched, and each scan pixel indicating the blank in the test image 300 is indicated as a blank. The scan image data 500 includes a first scan pixel group 550 formed from scan pixels and a second scan pixel group 510 formed from scan pixels. The first scan pixel group 550 and the second scan pixel group 510 correspond to the first test image 350 and the second test image 310, respectively. The first scan pixel group 550 includes 3416 pixel rows (pixel rows PL1 to PL3416) that indicate the 1700 dot rows forming the first test image 350. The pixel rows PL1 to PL3416 are aligned in the direction D1. Each pixel row is formed from scan pixels aligned in the direction D2. Although only PL1 and PL3146 are indicated as reference numerals of the pixel rows in FIG. 5. in the following, Y-th piece of pixel row (Y is an integer not less than 1 and not more than 3146) from a side of the pixel row PL1 may be referred to as a "pixel row PLY" (e.g., the 1206th pixel row may be referred to as a "pixel row PL1206"). As described above, in the first embodiment, the print resolution is 600 dpi and the scan resolution is 1200 dpi that is twice as much as the print resolution. Thus, if no image elongation occurs during scanning, the number of pixel rows forming the first scan pixel group 550 would be 3400 which are twice as many as 1700, the total number of nozzles. The first scan pixel group 550, however, includes 3416 pixel rows (the pixel rows PL1 to PL3416). Namely, image elongation corresponding to 16 pixel rows (see FIG. 2) has occurred.

The second scan pixel group 510 includes subgroups 512, 514, 516, 518, and 520. Each of the subgroups 512, 516, and 520 having no image elongation would be formed from 1000 pixel rows. In FIG. 5, however, each of the subgroups 512, 516, and 520 has the image elongation to include 1000 or more of pixel rows. Similarly, each of the subgroups 514 and 518 having no image elongation would be formed from 200 pixel rows. In FIG. 5, however, each of the subgroups 514 and 518 has the image elongation to include 200 or more of pixel rows.

In a step S14, the CPU 22 changes a pixel value (i.e., an RGB value) of each scan pixel in the scan image data 500 to a luminance value. The CPU 22 determines a luminance value V, for example, by substituting a R value, G value, and B value of each pixel for R, G, and B of the following numeral formula: luminance value $V=0.299 \times R+0.587 \times G+0.114 \times B$.

In a step S16, the CPU 22 calculates a first average luminance value that is an average value of luminance values of the scan pixels forming each pixel row, which forms the first scan pixel group 550 in the scan image data 500.

In a step S18, the CPU 22 calculates a second average luminance value that is an average value of luminance values of the scan pixels forming each pixel row, which forms the second scan pixel group 510 in the scan image data 500. Since the subgroups 514 and 518 correspond to the blank areas and the subgroups 512, 516, and 520 correspond to the dot areas, the second average luminance value for each pixel row forming the subgroups 514 and 518 is greater than the second average luminance value for each pixel row forming the subgroups 512, 516, and 520.

In a step S20, the CPU 22 refers to the second average luminance value of each pixel row calculated in the step S18, and identifies boundaries in the second scan pixel group 510. The CPU 22 identifies portions, at which the second average luminance value of one of the pixel rows is greatly different from the second average luminance value of the pixel row adjacent thereto, as boundaries in the subgroups 512 to 520. In the step S20 for the first time, the CPU 22 identifies a pixel row (in the first embodiment, a pixel row PL1206) forming a boundary between the subgroup 514 and the subgroup 516 (see B10 of FIG. 5).

In a step S22, the CPU 22 identifies the number of unit pixel rows, which is the number of pixel rows per one nozzle, from the pixel row PL1 to the boundary identified in the step S20 (i.e., the pixel row PL1206). Each of the pixel rows from the pixel row PL1 to the pixel row PL1206 corresponds to one of the nozzles N1 to N600. The CPU 22 identifies the number of unit pixel rows "2.01" by dividing the number of pixel rows "1206" by the number of nozzles "600" (see FIG. 5). The number of unit pixel rows identified in the step S22 can be also referred to as the number of pixel rows per one nozzle that reflects the influence of image elongation.

Figure 6:
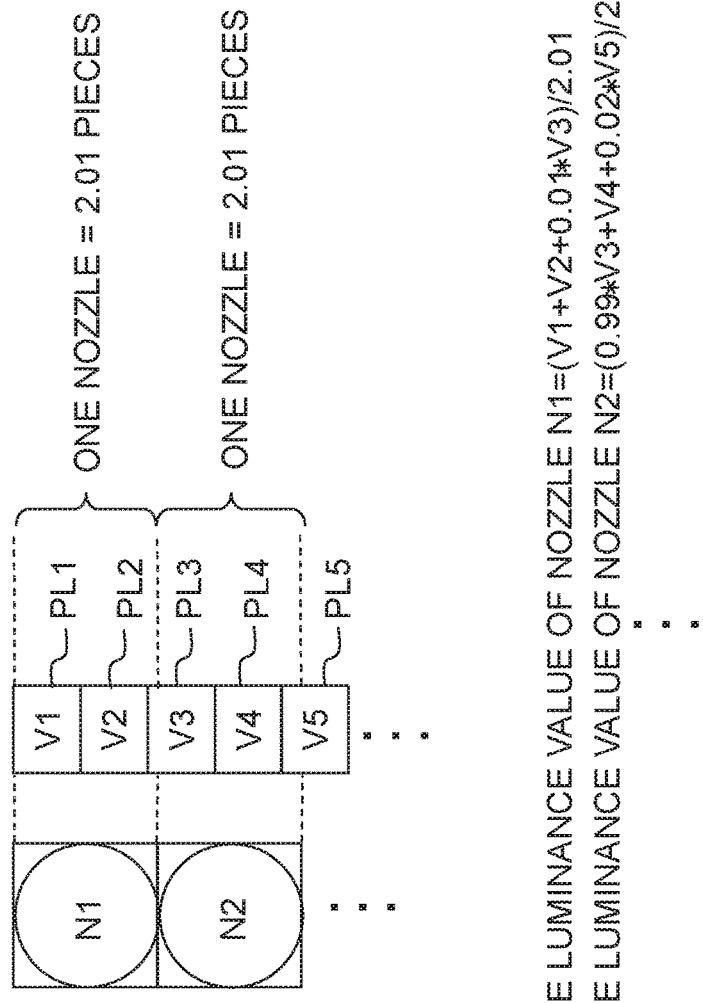
FIG. 6 depicts exemplary mapping of pixel rows to each nozzle.

In a step S24, the CPU 22 maps each nozzle to pixel rows. As described above, the CPU 22 identified the number of unit pixel rows "2.01" in the step S22. This means that one dot row printed by one nozzle is indicated by 2.01 pieces of pixel row. Thus, as depicted in FIG. 6, at first, the CPU 22 maps the pixel row PL1, the pixel row PL2, and 0.01 piece of pixel row of the pixel row PL3 to the nozzle N1. Then, the CPU 22 maps 0.99 pieces of pixel row of the pixel row PL3, the pixel row PL4, and 0.02 pieces of pixel row of the pixel row PL5 to the nozzle N2. In this manner, the CPU 22 sequentially maps each nozzle to 2.01 pieces of pixel row.

In a step S26, the CPU 22 calculates a nozzle luminance value corresponding to each nozzle. The nozzle luminance value of one nozzle is a luminance value of a dot formed by the one nozzle. For example, in the step S24, the pixel row PL1, the pixel row PL2, and 0.01 piece of pixel row of the pixel row PL3 were mapped to the nozzle N1. In that case, as depicted in FIG. 6, the CPU 22 calculates the sum (i.e., $V1+V2+0.01 \times V3$) of a first average luminance value V1 of the pixel row PL1, a first average luminance value V2 of the pixel row PL2, and a value acquired by multiplying a first average luminance value V3 of the pixel row PL3 by 0.01. The CPU 22 calculates the nozzle luminance value of the nozzle N1 by dividing the above sum by the number of unit pixel rows "2.01".

The CPU 22 calculates the nozzle luminance value of the nozzle N2 in a similar manner. Namely, the CPU 22 calculates the sum (i.e., $099 \times V3+V4+002 \times V5$) of a value acquired by multiplying the first average luminance value V3 of the pixel row PL3 by 0.99, a first average luminance vale V4 of the pixel row PL4, and a value acquired by multiplying a first average luminance value V5 of the pixel row PL5 by 0.02. The CPU 22 calculates the nozzle luminance value of the nozzle N2 by dividing the above sum by the number of unit pixel rows "2.01". The CPU 22 calculates the nozzle luminance value of each of the nozzles N3 to N 600 in a similar manner.

In a step S28, the CPU 22 calculates a characteristics value corresponding to each nozzle. The characteristics value of one nozzle indicates ink jetting characteristics of the one nozzle. The CPU 22 compares the nozzle luminance value of each nozzle calculated in the step S26 and a predefined target value, and calculates the difference therebetween as the characteristics value. When the nozzle luminance value is greater than the target value, the nozzle has a characteristic in which ink paler in color than a target is jetted. When the nozzle luminance value is smaller than the target value, the nozzle has a characteristic in which ink deeper in color than the target is jetted.

In a step S30, the CPU 22 determines whether the characteristics values of all the nozzles N1 to N1700 of the printing head 52 have been already calculated. When the characteristics values of all the nozzles N1 to N1700 have been already calculated, the determination of the CPU 22 in the step S30 is YES and the CPU 22 proceeds to a step S32. When the characteristics values of all the nozzles N1 to N 1700 are not yet calculated, the determination of the CPU 22 in the step S30 is NO and the CPU 22 returns to the step S20. In the step S20, the CPU 22 identifies a new boundary. Then, the CPU 22 re-executes the processing of the steps S22 to S28.

In a step S30 for the first time, the determination of the CPU 22 is NO. In the step S20 for the second time, the CPU 22 identifies a pixel row (a pixel row PL2414 in the first embodiment) forming a boundary (see B20 in FIG. 5) between the subgroup 518 and the subgroup 520 (see FIG. 5). Next, in the step S22 for the second time, the CPU 22 identifies the number of unit pixel rows from a pixel row (i.e., a pixel row PL1207) next to the pixel row PL identified in the step S20 performed most recently to a pixel row (i.e., the pixel row PL2414) identified in the step S20 for the second time. Specifically, the CPU 22 identifies the number of unit pixel rows "2.013" (see FIG. 5) by dividing the number of pixel rows "1208" by the number of nozzles "600". The number of unit pixel rows "2.013" calculated in the step S22 for the second time is greater than the number of unit pixel rows "2.01" calculated in the step S22 for the first time. Namely, the influence of image elongation on the subgroups 516 and 518 is greater than that on the subgroups 512 and 514. The processing from the step S24 to the step S28 for the second time is substantially the same as the processing from the step S24 to the step S28 for the first time. Thus, the detailed explanation therefor will be omitted.

Also in the step S30 for the second time, the determination of the CPU 22 is NO. In the step S20 for the third time, the CPU 22 identifies a pixel row (i.e., a pixel row PL3416) forming a boundary (see B30 in FIG. 5) between the subgroup 520 and a lower end blank in the direction D1 (see FIG. 5). In the step S22 for the third time, the CPU 22 identifies the number of unit pixel rows from a pixel row (i.e., a pixel row PL2415) next to the pixel row PL identified in the step S20 performed most recently to a pixel row (i.e., the pixel row PL3416) identified in the step S20 for the third time. Specifically, the CPU 22 identifies the number of unit pixel rows "2.004" by dividing the number of pixel rows "1002" by the number of nozzles "500" (see FIG. 5), The number of unit pixel rows "2.004" calculated in the step S22 for the third time is smaller than the number of unit pixel rows "2.01" and "2.013" calculated so far. Namely, the influence of image elongation on the subgroup 520 is smaller than that on the subgroups 512 to 518. The processing from the step S24 to the step S28 for the third time is substantially the same as the processing from the step S24 to the step S28 for the first and second times. Thus, the detailed explanation therefor will be omitted. In the step S30 for the third time, the determination of the CPU 22 is YES, and the CPU 22 proceeds to the step S32.

In the step S32, the CPU 22 generates characteristics data including the characteristics value of each nozzle. The CPU 22 stores the characteristics data generated in the step S32 in the memory 24. After finishing the step S32, the characteristics data generation processing indicated in FIG. 3 ends. Thereafter, for example, when the CPU 22 generates printing data, the CPU 22 corrects density of image data to be printed based on the characteristics value of each nozzle that is included in the characteristics data stored in the memory 24, and supplies the corrected image data as the printing data to the printer 50. This enables the printer 50 to perform printing in which the ink jetting characteristics of each nozzle are appropriately corrected.

As described above, in the first embodiment, the second test image 310 (see FIG. 2) of the test image 300 printed in the step S10 of FIG. 3 includes: the area 314, as the blank area, positioned between the areas 312 and 316 as the dot areas; and the area 318, as the blank area, positioned between the areas 316 and 320 as the dot areas. Thus, in the step S20 for the first time, the CPU 22 specifies the pixel row PL1206 that is the boundary between the subgroups 514 and 516, and specifies the number of pixel rows "1206". In the step S20 for the second time, the CPU 22 specifies the pixel row PL2414 that is the boundary between the subgroups 518 and 520, and specifies the number of pixel rows "1208". In the step S20 for the third time, the CPU 22 specifies the pixel row PL3416 that is the boundary between the subgroup 520 and the blank, and specifies the number of pixel rows "1002". In the step S24 for the first time, the CPU 22 calculates the number of unit pixels "2.01" for 600 nozzles including the nozzles N1 to N600. In the step S24 for the second time, the CPU 22 calculates the number of unit pixels "2.013" for 600 nozzles including the nozzles N601 to N1200. In the step S24 for the third time, the CPU 22 calculates the number of unit pixels "2.004" for 500 nozzles including the nozzles N1201 to N1700. Namely, the CPU 22 calculates the number of unit pixels that reflects the influence of image elongation for each of the nozzles (i.e., the nozzles N1 to N600; the nozzles N601 to N1200; and the nozzles N1201 to N1700) in the nozzle groups. Then, the CPU 22 calculates the nozzle luminance value of each nozzle by using the number of unit pixels calculated, and calculates the characteristics value of each nozzle by using the nozzle luminance value to generate the characteristics data (the steps S26 to S32). As descried above, the CPU 22 performs printing, in which the ink jetting characteristics of each nozzle are corrected, by correcting the density of the image data to be printed by use of the characteristics data and supplying the corrected image data as the printing data to the printer 50. Thus, in the first embodiment, the PC 10 may appropriately correct the ink jetting characteristics of each nozzle while reflecting the influence of image elongation.

A comparative example for explaining the action and effect of the first embodiment more clearly is explained. in the comparative example, in the step S10 of FIG. 3, the CPU 22 performs printing so that a test image that does not include the second test image 310 but includes the first test image 350 is printed on a sheet. Thus, in this comparative example, the processing of the steps S18 and S20 is not performed. In the step S22, the CPU 22 calculates "3416 (i.e., the number of pixel rows in the group 550)/1700 (i.e., the number of nozzles)" for the first scan pixel group 550 corresponding to the 1700 nozzles including the nozzles N1 to N1700, and identifies the number of unit pixel rows "2.009". It can be said that the number of unit pixel rows "2.009" calculated in the step S22 of the comparative example also reflects the influence of image elongation to some extent. In the technology of the comparative example, however, the CPU 10 identifies the number of unit pixel rows "2.009" uniformly for all the nozzles N1 to N1700. Thus, for example, when the movement speed of the scan execution part 72 locally changes during scanning, the CPU 10 can not calculate the characteristics value reflecting the influence of image elongation.

Meanwhile, in the first embodiment, the test image 300 includes the second test image 310 that includes the areas 312 to 320, as described above. The CPU 22 calculates the number of unit pixels "2.01" for the 600 nozzles including the nozzles N1 to N600, calculates the number of unit pixels "2.013" for the 600 nozzles including the nozzles N601 to N1200, and calculates the number unit pixels "2.004" for the 500 nozzles including the nozzles N1201 to N1700. Namely, in the first embodiment, the CPU 22 calculates the number of unit pixels including the influence of image elongation for each of the nozzles (i.e., the nozzles N1 to N600; the nozzles N601 to N1200; and the nozzles N1201 to N1700) in the nozzle groups, and calculates the characteristics value of each of the nozzles by using the number of unit pixels calculated. Even when the movement speed of the scan execution part 72 locally changes during scanning, that influence can be reduced in the first embodiment, unlike the comparative example. Thus, for example, even when the degree of image elongation depends on the position, the PC 10 of the first embodiment can appropriately identify the characteristics value of each nozzle while reflecting the influence of image elongation.

In the first embodiment, the second test image 310 (see FIG. 2) includes two blank areas(i.e., the areas 314 and 316). Thus, the CPU 22 identifies more boundaries in the second scan pixel group 510 than a configuration in which the test image includes only one blank area (the step S22 of FIG. 3). Thus, in the first embodiment, the CPU 10 can identify the characteristics value of each nozzle while appropriately including the influence of image elongation.

In the first embodiment, in the step S10 of FIG. 3, the CPU 22 generates one test pattern file including the test pattern data 100 and supplies the test pattern file to the printer 50. This allows the test image 300 including the first test image 350 and the second test image 310 to be printed on one sheet P. In the step S12, one scan image file including the scan image data 500 (FIG. 5), which is generated by causing the scan execution part 72 to scan the sheet P having the test image 300 printed thereon, is acquired. Namely, the first scan pixel group 550 and the second scan pixel group 510 are formed by the same scan processing. This allows the CPU 22 to calculate the characteristics value while reflecting the influence of image elongation more appropriately than a case in which the first test image 350 and the second test image 310 are printed and scanned separately.

The CPU 22 is an exemplary image processing apparatus. The printing head 52 is an exemplary printing execution part. The sheet P is an exemplary first recording medium and an exemplary second recording medium. The direction D1 is an exemplary first direction and the direction D2 is an exemplary second direction. The area 312 is exemplary N1 pieces of dots. The area 314 is an exemplary first blank area. The area 316 is exemplary N3 pieces of dots. The area 318 is an exemplary second blank area. The area 320 is exemplary N5 pieces of dots. The first scan pixel group 550 is exemplary first scan image data. The second scan pixel group 510 is exemplary second scan image data. The boundary B10 of FIG. 5 is an exemplary first boundary, and the boundary B20 of FIG. 5 is an exemplary second boundary. The RGB value is an exemplary pixel value. The luminance value is an exemplary relevant value.

Second Embodiment

In a second embodiment, some of the characteristics data generation processing (see FIG. 3) are different from those of the first embodiment. FIG. 7 schematically depicts a manner of identifying a boundary according to the second embodiment (the step S20 of FIG. 3). As depicted in FIG. 7, in the step S20 for the first time according to the second embodiment, the CPU 22 identifies a pixel row PL1004 forming a boundary B110 between the subgroup 512 and the subgroup 514. In the step S22, the CPU 22 identifies the number of unit pixel rows "2.004" (see FIG. 7) by dividing the number of pixel rows "1004" from the pixel row PL1 to the pixel row PL1004 by the number of nozzles "500". In the step S20 for the second time, the CPU 22 identifies a pixel row P12212 forming a boundary B120 between the subgroup 516 and the subgroup 518. In the step S22 for the second time, the CPU 22 identifies the number of unit pixel rows "2.013" by dividing the number pixel rows "1208" from the pixel row PL1005 to the pixel row PL2212 by the number of nozzles "600". In the step S20 for the third time, the CPU 22 identifies the pixel row PL3416 forming a boundary B130 between the subgroup 520 and a lower end blank in the direction D1. In the step S22 for the third time, the CPU 22 identifies the number of unit pixel rows "2.006" by dividing the number of pixel rows "1204" from the pixel row PL2213 to the pixel row PL3416 by the number of nozzles "600". The pieces of processing except for the above are the same as those of the first embodiment. The PC 10 of the second embodiment can achieve the same action and effect as those of the first embodiment.

Third Embodiment

In a third embodiment, some of the characteristics data generation processing (see FIG. 3) are different from those of the first embodiment. FIG. 8 schematically depicts a manner of identifying a boundary according to the third embodiment (the step S20). As depicted in FIG. 8, in the step S20 for the first time according to the third embodiment, the CPU 22 identifies the pixel row PL1004 forming a boundary B210 between the subgroup 512 and the subgroup 514. In the step S22, the CPU 22 identifies the number of unit pixel rows "2.008" by dividing the number of pixel rows "1004" from the pixel row PL1. to the pixel row PL1004 by the number of nozzles "500" (see FIG. 8). In the step S20 for the second time, the CPU 22 identifies the pixel row PL1206 forming a boundary B220 between the subgroup 514 and the subgroup 516. In the step S22 for the second time, the CPU 22 identifies the number of unit pixel rows "2.02" by dividing the number of pixel rows "202" from the pixel row PL1005 to the pixel row PL1206 by the number of nozzles "100". In the step S20 for the third time, the CPU 22 identifies a pixel row PL2214 forming a boundary B230 between the subgroup 516 and the subgroup 518. In the step S22 for the third time, the CPU 22 identifies the number of unit pixel rows "2.016" by dividing the number of pixel rows "1008" from the pixel row PL1207 to the pixel row PL2214 by the number of nozzles "500". In the step S20 for the fourth time, the CPU 22 identifies the pixel row PL2414 forming a boundary B240 between the subgroup 518 and the subgroup 520. In the step S22 for the fourth time, the CPU 22 identifies the number of unit pixel rows "2.00" by dividing the number of pixel rows "200" from a pixel row PL2215 to the pixel row PL2414 by the number of nozzles "100". In the step S20 for the fifth time, the CPU 22 identifies the pixel row PL3416 forming a boundary B250 between the subgroup 520 and a lower end blank in the direction D1. In the step S22 for the fifth time, the CPU 22 identifies the number of unit pixel rows "2.004" by dividing the number of pixel rows "1002" from the pixel row PL2415 to the pixel row PL3416 by the number of nozzles "500". The pieces of processing except for the above are the same as those of the first embodiment. The PC 10 of the third embodiment can achieve the same action and effect as those of the first embodiment.

As above, the embodiments of technology disclosed in the present specification are explained. Those embodiments, however, are mere examples, and the claims below are not limited by the embodiments. The subject matter of the present teaching includes various modifications of the above embodiments. Modified embodiments of the embodiments are described below.

First Modified Embodiment

In the above embodiments, the area 350 of the test image 300 depicted in FIG. 2 includes the 1700 dot rows arranged in the direction D1. Similarly, the areas 312, 316, and 320 include the 500 dot rows arranged in the direction D1. Each dot row is formed from the dots arranged in the direction D2. In other words, in the above embodiments, the areas 352, 312, 316, and 320 each have a width in the direction D2 (i.e., a length corresponding to two or more dots). The present teaching, however, is not limited thereto. In a first modified embodiment, the area 350 may be formed from 1700 dots arranged in the direction D1. Similarly, each of the areas 312, 316, and 320 may be formed from 500 dots arranged in the direction D1. Namely, each of the areas 350, 312, 316, and 320 may not have the width in the direction D2. In the step S16 of FIG. 3 according to the first modified embodiment, the CPU 22 is only required to identify the luminance value of each pixel included in the first scan pixel group 550.

Similarly, in the step S18 according to the first modified embodiment, the CPU 22 is only required to identify the luminance value of each pixel included in the second scan pixel group 510.

Second Modified Embodiment

In the above embodiments, the second test image 310 included in the test image 300 of FIG. 2 includes two blank areas (i.e., the areas 314 and 318). The present teaching, however, is not limited thereto. If the second test image includes one blank area between two dot areas, the number of blank areas may be one. Also in a second modified embodiment, the CPU 22 can identify a pixel row of a boundary (the step S20 of FIG. 3).

Third Modified Embodiment

In the step S10 of FIG. 3 according to the above embodiments, the CPU 22 generates one test pattern file including the test pattern data 100 and supplies the test pattern file to the printer 50. This allows the test image 300 including the first test image 350 and the second test image 310 to be printed on one sheet P. In the step S12, one scan image file including the scan image data 500 (FIG. 5), which is generated by causing the scan execution part 72 to scan the sheet P having the test image 300 printed thereon, is acquired. The present teaching, however, is not limited thereto. In a third modified embodiment, the first printing pixel group 150 may be included in a file different from that of the second printing pixel group 110. In that case, the first test image 350 and the second test image 310 may be printed on mutually different sheets and the first test image 350 may be scanned separately from the second test image 310. In that case, the scan image file corresponding to the first scan pixel group 550 may be acquired independently of the scan image file corresponding to the second scan pixel group 510.

Fourth Modified Embodiment

In the above embodiments, the print resolution when the test pattern is printed is 600 dpi and the scan resolution when the test image 300 is scanned is 1200 dpi that is twice as much as the print resolution. In a fourth embodiment, the print resolution when the test pattern is printed and the scan resolution when the test image 300 is scanned may be any other values than the above values.

Fifth Modified Embodiment

The printer 50 may be a printer for executing color printing. In that case, the printing head 52 may include 1700 nozzle arrays arranged in the direction D1 (see FIG. 2). Each nozzle array may include four nozzles from which four kinds of inks are jetted, the four kinds of inks being three chromatic inks (cyan (C), magenta (M), and yellow (Y)) and one achromatic ink (black (k)). In that case, the test pattern data may include test patterns for the respective colors (i.e., C, M, Y, and K). In the fifth modified embodiment, the CPU 22 can execute the characteristic data generation processing for each nozzle corresponding to one of the four kinds of inks (i.e., C, M, Y, and K).

Sixth Modified Embodiment

In the above embodiments, the printing head 52 is the line head that moves neither in the direction D1 nor in the direction D2. The present teaching, however, is not limited thereto. In a sixth modified embodiment, the printing head may be a serial head. Namely, the printing head may jet ink while moving (i.e., scanning) in the direction D2. In that case, the sheet P may be conveyed in the direction D1. The CPU 22 can execute the characteristics data generation processing of FIG. 3 also when the printing head of the serial type is used.

Seventh Modified Embodiment

The scanner 70 may be a scanner of an Auto Document Feeder (ADF). In that case, the scanner 70 is only required to include a document feeder, the scan execution part 72, and the controller. The scan execution part 72 may execute, without moving, scanning while the document feeder moves the sheet P. In that case also, the scan execution part 72 may move relative to the sheet P in the direction D1 (see FIG. 2).

Eighth Modified Embodiment

In the above embodiments, the pieces of processing in FIG. 3 are achieved by software (i.e., a program). In an eighth modified embodiment, at least one of the pieces of processing may be achieved by hardware, such as a logic circuit.

The technical elements described in the present specification and drawings are intended to exert technical usability individually or by way of various combinations. Further, the techniques exemplified in the present specification and drawings are intended to achieve purposes at the same time, and to gain the technical usability by achieving one of the purposes.

What is claimed is:

1. An image processing apparatus, comprising
a controller configured to control a printing execution unit including N pieces of nozzle arranged in a first direction, the N being an integer equal to or more than three,
wherein the N pieces of nozzle includes:
N1 pieces of nozzle continuously arranged;
N2 pieces of nozzle arranged continuously and adjacent to the N1 pieces of nozzle; and
N3 pieces of nozzle arranged continuously and adjacent to the N2 pieces of nozzle, the N1, N2, N3 being integers equal to or more than one,
wherein the controller is configured to perform:
causing the printing execution unit to execute printing of a first test image by jetting ink droplets from all the N pieces of nozzle to a first recording medium, the first test image including N pieces of dot arranged in the first direction on the first recording medium;
causing the printing execution unit to execute printing of a second test image by jetting ink droplets from the N1 pieces of nozzle and the N3 pieces of nozzle to a second recording medium without jetting ink droplets from the N2 pieces of nozzle,
the second test image being different from the first test image,
the second test image including: N1 pieces of dot arranged in the first direction on the second recording medium; N3 pieces of dot arranged in the first direction on the second recording medium; and a first blank area between the N1 pieces of dot and the N3 pieces of dot;
acquiring first scan image data generated by causing the scan execution unit to scan the first recording medium by moving in the first direction after the first test image is printed on the first recording medium, the first scan image data including M pieces of dot pixel indicating the N pieces of dot included in the first test image, the M being an integer equal to or more than the N;

acquiring second scan image data generated by causing the scan execution unit to scan the second recording medium by moving in the first direction after the second test image is printed on the second recording medium, the second scan image data including:

M1 pieces of dot pixel indicating the N1 pieces of dot included in the second test image;

M2 pieces of blank pixel indicating the first blank area included in the second test image; and M3 pieces of dot pixel indicating the N3 pieces of dot included in the second test image, the M1 being an integer equal to or more than the N1, the M2 being an integer equal to or more than the N2, and the M3 being an integer equal to or more than the N3;

identifying a first boundary which is at least one of (1) a boundary between the M1 pieces of dot pixel and the M2 pieces of blank pixel and (2) a boundary between the M2 pieces of blank pixel and the M3 pieces of dot pixel, by using the M2 pieces of blank pixel included in the second scan image data;

identifying a first number of pixels including the number of pixels of the M1 pieces of dot pixel present at a first side of the first boundary and a second number of pixels including the number of pixels of the M3 pieces of dot pixel present at a second side of the first boundary, by using the second scan image data;

calculating a first number of unit pixels which is the number of pixels per one nozzle for the N1 pieces of nozzle by using the N1 and the first number of pixels;

calculating a second number of unit pixels which is the number of pixels per one nozzle for the N3 pieces of nozzle by using the N3 and the second number of pixels;

calculating a relevant value related to density of a dot formed by each of the N pieces of nozzle by using the first number of unit pixels, the second number of unit pixels, and a pixel value of each of the M pieces of dot pixel included in the first scan image data; and generating characteristics data indicating ink jetting characteristics of the N pieces of nozzle by using N pieces of the relevant value calculated for the N pieces of nozzle.

2. The image processing apparatus according to claim 1, wherein the first boundary is the boundary between the M2 pieces of blank pixel and the M3 pieces of dot pixel, wherein the controller is configured to perform:

identifying the first number of pixels which is a total number of pixels of the M1 pieces of dot pixel and the M2 pieces of blank pixel present at the first side of the first boundary and the second number of pixels including the number of pixels of the M3 pieces of dot pixel present at the second side of the first boundary;

calculating the first number of unit pixels which is the number of pixels per one nozzle for (N1+N2) pieces of nozzle including the N1 pieces of nozzle and the N2 pieces of nozzle, by using the N1, the N2, and the first number of pixels; and calculating the second number of unit pixels which is the number of pixels per one nozzle for the N3 pieces of nozzle, by using the N3 and the second number of pixels.

3. The image processing apparatus according to claim 1, wherein the first boundary includes the boundary between the M1 pieces of dot pixel and the M2 pieces of blank pixel and the boundary between the M2 pieces of blank pixel and the M3 pieces of dot pixel, wherein the controller is configured to perform:

identifying the first number of pixels, the second number of pixels, and a third number of pixels, the first number of pixels being the number of pixels of the M1 pieces of dot pixel present at the first side of the boundary, of the first boundary, between the M1 pieces of dot pixel and the M2 pieces of blank pixel, the second number of pixels being the number of pixels of the M3 pieces of dot pixel present at the second side of the boundary, of the first boundary, between the M2 pieces of blank pixel and the M3 pieces of dot pixel, and the third number of pixels being the number of pixels of the M2 pieces of blank pixel present between the boundary between the M1 pieces of dot pixel and the M2 pieces of blank pixel and the boundary between the M2 pieces of blank pixel and the M3 pieces of dot pixel;

calculating the first number of unit pixels which is the number of pixels per one nozzle for the N1 pieces of nozzle by using the N1 and the first number of pixels;

calculating the second number of unit pixels which is the number of pixels per one nozzle for the N3 pieces of nozzle by using the N3 and the second number of pixels;

calculating a third number of unit pixels which is the number of pixels per one nozzle for the N2 pieces of nozzle by using the N2 and the third number of pixels; and calculating the relevant value related to density of a dot formed by each of the N pieces of nozzle by using the first number of unit pixels, the second number of unit pixels, the third number of unit pixels, and a pixel value of each of the M pieces of dot pixel included in the first scan image data.

4. The image processing apparatus according to claim 1, wherein the first test image is printed on the first recording medium, the first test image including N pieces of dot row arranged in the first direction on the first recording medium, by jetting ink droplets from all the N pieces of nozzle onto the first recording medium multiple times while the first recording medium moves relative to the printing execution unit in a second direction orthogonal to the first direction, wherein the first scan image data includes M pieces of dot pixel row indicating the N pieces of dot row included in the first test image, the M being an integer equal to or more than the N, wherein the controller is configured to perform:

calculating an average luminance value of dot pixels forming each of the M pieces of dot pixel row for each of the M pieces of dot pixel row included in the first scan image data, by using a pixel value of each of the dot pixels; and calculating the relevant value related to density of a dot formed by each of the N pieces of nozzle by using the first number of unit pixels, the second number of unit pixels, and M pieces of the average luminance value calculated for the M pieces of dot pixel row included in the first scan image data.

5. The image processing apparatus according to claim 1, wherein the second recording median is the same as the first recording medium, and
wherein the controller is configured to perform:
printing both of the first test image and the second test image on the first recording medium by supplying a test image file indicating both the first test image and the second test image to the printing execution unit; and
acquiring a scan image file which is generated by causing the scan execution unit to scan the first recording medium, the scan image file including the first scan image data and the second scan image data.

6. The image processing apparatus according to claim 1, wherein the N pieces of nozzle further include N4 pieces of nozzle arranged continuously and adjacent to the N3 pieces of nozzle and N5 pieces of nozzle arranged continuously and adjacent to the N4 pieces of nozzle, the N4 and N5 being an integer equal to or more than one,
wherein the second test image includes:
the N1 pieces of dot arranged in the first direction on the second recording medium;
the N3 pieces of dot arranged in the first direction on the second recording medium;
the first blank area between the N1 pieces of dot and the N3 pieces of dot; N5 pieces of dot arranged in the first direction on the second recording medium; and
a second blank area between the N3 pieces of dot and the N5 pieces of dot,
wherein the second test image is printed on the second recording medium by jetting ink droplets from the N1 pieces of nozzle and the N3 pieces of nozzle and the N5 pieces of nozzle to the second recording medium without jetting ink droplets from the N2 pieces of nozzle and the N4 pieces of nozzle,
wherein the second scan image data further includes M4 pieces of blank pixel indicating the second blank area included in the second test image and M5 pieces of dot pixel indicating the N5 pieces of dot included in the second test image, the M4 being an integer equal to more than the N4, and the M5 being an integer equal to or more than the N5, and
wherein the controller is configured to perform:
identifying a second boundary which is at least one of a boundary between the M3 pieces of dot pixel and the M4 pieces of blank pixel and a boundary between the M4 pieces of blank pixel and the M5 pieces of dot pixel, by using the M4 pieces of blank pixel included in the second scan image data;
identifying a fourth number of pixels including the number of pixels of the M5 pieces of dot pixel present at a second side of the second boundary by using the second scan image data;
calculating a fourth number of unit pixels which is the number of pixels per one nozzle for the N5 pieces of nozzle by using the N5 and the fourth number of pixels; and
calculating the relevant value related to density of a dot formed by each of the N pieces of nozzle by using the first number of unit pixels, the second number of unit pixels, the fourth number of unit pixels, and a pixel value of each of the M pieces of dot pixel included in the first scan image data.

7. The image processing apparatus according to claim 1, wherein the first test image is printed on the first recording medium without moving the printing execution unit in a second direction orthogonal to the first direction, and
wherein the second test image is printed on the second recording medium without moving the printing execution unit in the second direction.

8. A non-transitory computer-readable medium storing an image processing program for a computer of an image processing apparatus,
wherein the program is configured to control a printing execution unit which includes N pieces of nozzle arranged in a first direction, the N being an integer equal to or more than three, the N pieces of nozzle including: N1 pieces of nozzle continuously arranged, N2 pieces of nozzle arranged continuously and adjacent to the N1 pieces of nozzle, and N3 pieces of nozzle arranged continuously and adjacent to the N2 pieces of nozzle, the N1, N2, N3 being an integer equal to or more than one, and
wherein the program causes the computer to perform:
causing the printing execution unit to execute printing of a first test image by jetting ink droplets from all the N pieces of nozzle to a first recording medium, the first test image including N pieces of dot arranged in the first direction on the first recording medium:
causing the printing execution unit to execute printing of a second test image by jetting ink droplets from the N1 pieces of nozzle and the N3 pieces of nozzle to a second recording medium without jetting ink droplets from the N2 pieces of nozzle,
the second test image being different from the first test image,
the second test image including: N1 pieces of dot arranged in the first direction on the second recording medium; N3 pieces of dot arranged in the first direction on the second recording medium; and a first blank area between the N1 pieces of dot and the N3 pieces of dot;
acquiring first scan image data generated by causing the scan execution unit to scan the first recording medium by moving in the first direction after the first test image is printed on the first recording medium, the first scan image data including M pieces of dot pixel indicating the N pieces of dot included in the first test image, the M being an integer equal to or more than the N;
acquiring second scan image data generated by causing the scan execution unit to scan the second recording medium by moving in the first direction after the second test image is printed on the second recording medium, the second scanning image data including:
M1 pieces of dot pixel indicating the N1 pieces of dot included in the second test image;
M2 pieces of blank pixel indicating the first blank area included in the second test image; and
M3 pieces of dot pixel indicating the N3 pieces of dot included in the second test image the M1 being an integer equal to or more than the N1, the M2 being an integer equal to or more than the N2, and the M3 being an integer equal to or more than the N3;
identifying a first boundary which is at least one of (1) a boundary between the M1 pieces of dot pixel and the M2 pieces of blank pixel and (2) a boundary between the M2 pieces of blank pixel and the M3 pieces of dot pixel, by using the M2 pieces of blank pixel included in the second scan image data;

identifying a first number of pixels including the number of pixels of the M1 pieces of dot pixel present at a first side of the first boundary and a second number of pixels including the number of pixels of the M3 pieces of dot pixel present at a second side of the first boundary, by using the second scan image data;

calculating a first number of unit pixels which is the number of pixels per one nozzle for the N1 pieces of nozzle by using the N1 and the first number of pixels;

calculating a second number of unit pixels which is the number of pixels per one nozzle for the N3 pieces of nozzle by using the N3 and the second number of pixels;

calculating a relevant value related to density of a dot formed by each of the N pieces of nozzle by using the first number of unit pixels, the second number of unit pixels, and a pixel value of each of the M pieces of dot pixel included in the first scan image data; and generating characteristics data which indicates ink jetting characteristics of the N pieces of nozzle by using N pieces of the relevant value calculated for the N pieces of nozzle.

\* \* \* \* \*